(12) United States Patent
Buck et al.

(10) Patent No.: US 8,130,969 B2
(45) Date of Patent: Mar. 6, 2012

(54) MULTI-CHANNEL ECHO COMPENSATION SYSTEM

(75) Inventors: Markus Buck, Biberach (DE); Tim Haulick, Blaubeuren (DE); Martin Roessler, Ulm (DE); Gerhard Uwe Schmidt, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 1359 days.

(21) Appl. No.: 11/787,348

(22) Filed: Apr. 16, 2007

(65) Prior Publication Data
US 2008/0031466 A1 Feb. 7, 2008

(30) Foreign Application Priority Data

Apr. 18, 2006 (EP) .................................. 06008006

(51) Int. Cl.
*H04B 3/20* (2006.01)
*H04B 15/00* (2006.01)
(52) U.S. Cl. .......................................... 381/66; 381/93
(58) Field of Classification Search .................... 381/66, 381/93, 83, 318, 317, 94.1, 95, 96; 379/406.01, 379/406.04
See application file for complete search history.

(56) References Cited

U.S. PATENT DOCUMENTS

| | | | |
|---|---|---|---|
| 6,049,607 A | 4/2000 | Marash et al. ................. | 379/410 |
| 6,421,377 B1 | 7/2002 | Langberg et al. .............. | 375/222 |
| 6,442,275 B1 | 8/2002 | Diethorn ................... | 379/406.14 |
| 6,510,225 B1 | 1/2003 | Robertson et al. ......... | 379/406.1 |
| 6,738,480 B1 | 5/2004 | Berthault et al. | |
| 6,839,426 B1 | 1/2005 | Kamoi et al. ............ | 379/406.01 |
| 6,895,095 B1 | 5/2005 | Thomas ....................... | 381/94.7 |
| 7,283,957 B2 * | 10/2007 | Minde et al. .................. | 704/229 |
| 7,403,609 B2 * | 7/2008 | Hirai et al. ............... | 379/406.01 |
| 2002/0176585 A1 | 11/2002 | Egelmeers et al. ........ | 381/71.11 |
| 2003/0021389 A1 | 1/2003 | Hirai et al. ......................... | 379/3 |
| 2003/0091182 A1 | 5/2003 | Marchok et al. ......... | 379/392.01 |
| 2003/0185402 A1 | 10/2003 | Benesty et al. .................. | 381/66 |
| 2004/0018860 A1 | 1/2004 | Hoshuyama ............... | 455/569.1 |
| 2004/0125942 A1 | 7/2004 | Beaucoup et al. ........ | 379/406.01 |
| 2005/0213747 A1 | 9/2005 | Popovich et al. | |
| 2006/0018459 A1 | 1/2006 | McCree ................... | 379/406.06 |

(Continued)

FOREIGN PATENT DOCUMENTS

| | | |
|---|---|---|
| EP | 1 404 147 A2 | 3/2004 |
| EP | 1 406 397 A1 | 4/2004 |
| WO | WO 93/17510 | 9/1993 |

OTHER PUBLICATIONS

Gänsler, et al., "An Adaptive Nonlinearity Solution to the Uniqueness Problem of Stereophonic Echo Cancellation," *IEEE*, Murray Hill, New Jersey, pp. 1885-1888, 2002.

(Continued)

*Primary Examiner* — Ping Lee
(74) *Attorney, Agent, or Firm* — Sunstein Kann Murphy & Timbers LLP

(57) ABSTRACT

An echo compensation system may remove undesirable audio signals. The echo compensation system may utilize adaptive filters to remove echoes and undesirable signals received by a microphone. The echo compensation system may inhibit adaptation of an adaptive filter when left and right channel audio signals are highly correlated. In a two-channel system, inhibiting adaptation of one of two adaptive filters may reduce computational power requirements, while still removing undesirable signals. In a four-channel system, inhibiting adaptation of all but one of the four adaptive filters may reduce computational power requirements by a greater percentage.

28 Claims, 8 Drawing Sheets

U.S. PATENT DOCUMENTS

| | | | |
|---|---|---|---|
| 2006/0062380 A1 | 3/2006 | Kim et al. | 379/406.01 |
| 2006/0067518 A1 | 3/2006 | Klinke et al. | 379/406.01 |
| 2006/0233353 A1 | 10/2006 | Beaucoup et al. | 379/406.01 |
| 2007/0093714 A1 | 4/2007 | Beaucoup | 600/437 |
| 2008/0260175 A1* | 10/2008 | Elko | 381/73.1 |

OTHER PUBLICATIONS

Schmidt, et al., "Signal Processing for In-Car Communication Systems," *Elsevier*, pp. 1307-1326, 2005.

Kuo, et al., "Acoustic Noise and Echo Cancellation Microphone System for Videoconferencing," *IEEE Transactions on Consumer Electronics*, No. 4, pp. 1150-1158, Nov. 1995.

Sondhi, et al., "Adaptive Echo Cancellation for Speech Signals," pp. 327-356, 1991.

Storn, R., "Echo Cancellation Techniques for Multimedia Applications—a Survey," pp. 1-53, Nov. 1996.

Benesty et el., "A Hybrid Mono/Stereo Acoustic Echo Canceler", IEEE Transactions on Speech and Audio Processing, vol. 6, No. 5, pp. 468-475, Sep. 1988.

* cited by examiner

MULTI-CHANNEL ECHO COMPENSATION SYSTEM

PRIORITY CLAIM

This application claims the benefit of priority under 35 U.S.C. §119 to European Patent Application No. 06 008006.6, filed Apr. 18, 2006, which is incorporated by reference.

BACKGROUND OF THE INVENTION

1. Technical Field

This disclosure is directed to a multi-channel echo compensation system. In particular, this disclosure relates to a system to compensate for echoes generated by external audio sources.

2. Related Art

Hands-free telephone systems are used in vehicles. Such systems may include one or more receivers that acquire speech signals. Loudspeakers may also be mounted in the vehicle. A loudspeaker may deliver audio signals from various audio sources. The receivers may acquire the audio signals transmitted by the loudspeakers. Due to speaker placement and the configuration of a vehicle interior, the receiver may acquire echoes. Such signals may distort the microphone signals.

Existing hands-free systems for echo-compensation may not adequately address echo signals originating from loudspeakers. Such systems may introduce artifacts into the signal path. Therefore, a need exists for an echo-compensation system that reduces echo signals originating from loudspeakers in a vehicle.

SUMMARY

An echo compensation system may remove undesirable audio signals. The echo compensation system may utilize adaptive filters to remove echoes and undesirable signals received by a microphone. The echo compensation system may inhibit adaptation of an adaptive filter when left and right channel audio signals are highly correlated. In a two-channel system, inhibiting adaptation of one of two adaptive filters may reduce computational power requirements while still removing undesirable signals. In a four-channel system, inhibiting adaptation of all but one of the four adaptive filters may reduce computational power requirements by a greater percentage.

Left and right channel adaptive filters may receive signals from a pre-processor and generate a compensation signal. When the compensation signal is added to the microphone output signal, the undesirable audio signals acquired by a microphone due to the loudspeakers may be removed or dampened.

The pre-processor may determine a correlation value by generating a sum and difference signal corresponding to a left and right channel audio signal. The left and right channel audio signals may be highly correlated if a difference signal is below a predetermined value. When the pre-processor determines that the left and right channel audio signals are highly correlated, the pre-processor may inhibit adaptation of all but one of the adaptive filters. This may reduce the computation load while providing adequate echo compensation.

Other systems, methods, features and advantages will be, or will become, apparent to one with skill in the art upon examination of the following figures and detailed description.

It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION OF THE PREFERRED EMBODIMENTS

Some audio systems in vehicles may use beam-forming circuits to communicate with multiple microphones to combine the microphone output signals. Such audio systems may use adaptive filters to compensate for unwanted signals contained in the microphone signal. Such adaptive filters may use the input signals from the audio source to determine a compensation signal.

In some systems, the adaptive filters may model the undesirable signals captured by the microphone. The adaptive filters may receive the left-channel and right-channel output signals from the source device used to drive the loudspeakers. The adaptive filters may provide a compensation signal, which may approximate the signal acquired by the microphones. The portion of the microphone signal contributed by the loudspeaker may be removed or dampened by subtracting the compensation signal from the microphone signal.

In a vehicle environment, the square of the absolute value of the coherence value may vary greatly. Coherence may be shown by the formula:

$$C(\Omega) = \left| \frac{S_{x_L x_R}(\Omega)}{\sqrt{S_{x_L x_L}(\Omega) S_{x_R x_R}(\Omega)}} \right|^2$$

In the above equation, $S_{x_L x_R}(\Omega)$, $S_{x_L x_L}(\Omega)$ and $S_{x_R x_R}(\Omega)$ denote the cross-power spectral density and the auto-power spectral densities, respectively, of the left-channel and right-channel signals supplied to the adaptive filters.

Music signals may exhibit very low coherence. In contrast, audio signals representing news or interviews may exhibit very high coherence such that the left and right-channel signals may be linearly dependent. The coherence of such signals approximately equals one, and the cost functions used in some multi-channel adaptation processes may not have a unique solution. As a result, the adaptive filter coefficients may need to be recalculated when a speaker change occurs. During this time, undesirable echoes may be heard.

Figure 1:
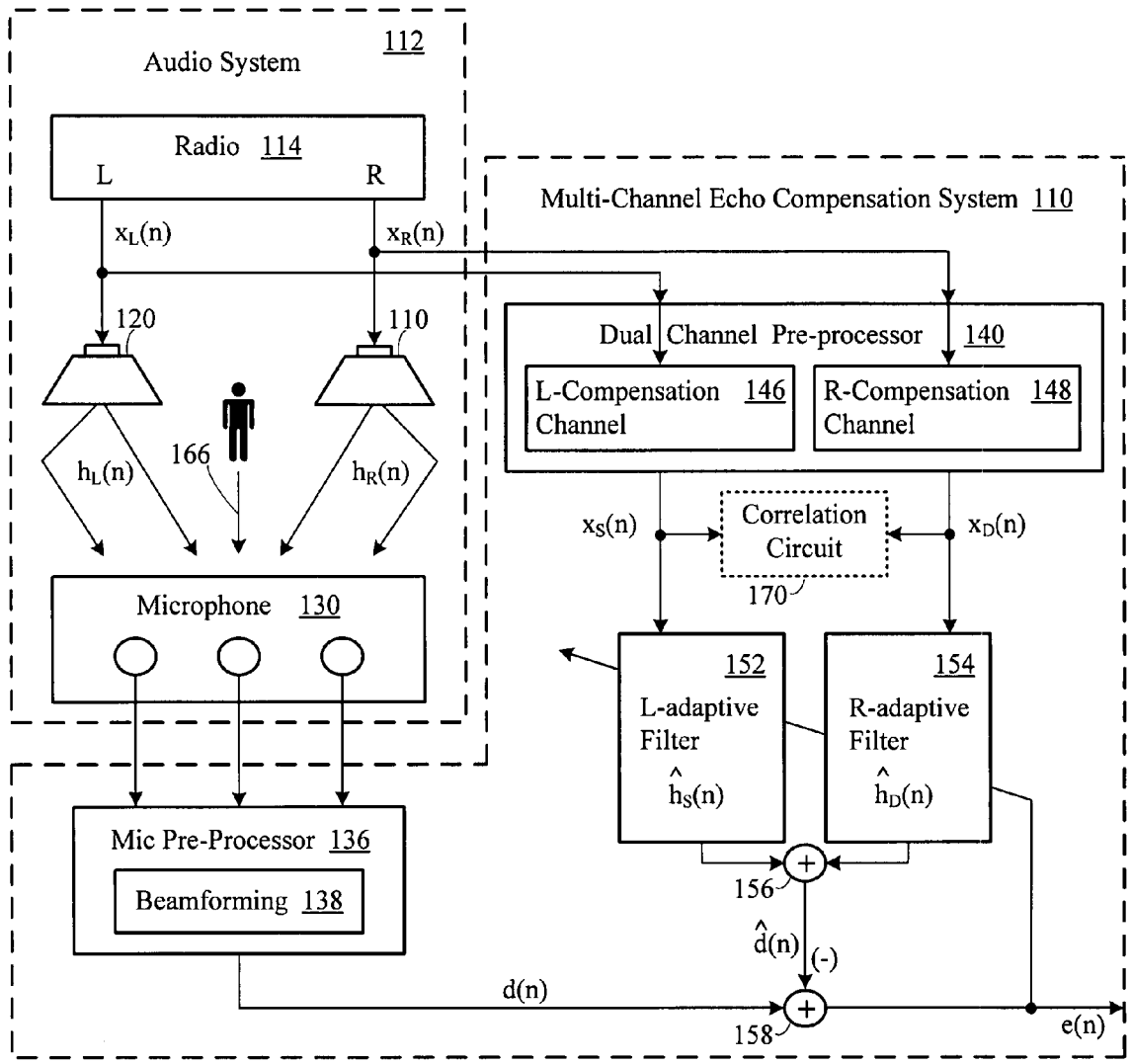
FIG. 1 shows an echo-compensation system.

FIG. 1 shows a multi-channel echo compensation system 110. The multi-channel echo compensation system may be linked to an audio system 112, such as an audio system in a vehicle. A vehicle audio device, such as a receiver or radio 114, may supply a stereo signal, including a left-channel input signal $x_L(n)$ and a right-channel input signal $x_R(n)$. Two loudspeakers 116 and 120 may audibly output the left-channel input signal $x_L(n)$ and right-channel input signal $x_R(n)$. A plurality of microphones 130 may acquire the audio signals produced by the human speaker, but may also acquire the audio signals generated by the loudspeakers 116 and 120. Two or more of microphones may be used, including a microphone array.

The audio signals transmitted by the loudspeakers 116 and 120 in the vehicle may be described through the following finite impulse response equations. The variable n indicates the time dependence of the coefficients.

$$h_L(n)=[h_{L,0}(n),h_{L,1}(n),\ldots,h_{L,L-1}(n)]^T \text{ and}$$

$$h_R(n)=[h_{R,0}(n),h_{R,1}(n),\ldots,h_{R,L-1}(n)]^T.$$

A microphone pre-processing circuit 136 may process the signals acquired by the microphones 130. The microphone pre-processing circuit 136 may perform linear time invariant processing, such as beam-forming or high-pass filtering. The output of the microphone pre-processing circuit may be denoted as d(n) or the pre-processed microphone output signal. A beam-forming circuit 138 may increase the signal-to-noise ratio of the microphone output signal d(n), and may provide directivity to a microphone array.

A left compensation channel 146 of the dual-channel pre-processing circuit 140 may receive the left-channel input signal $x_L(n)$. A right compensation channel 148 of the dual-channel pre-processing circuit 140 may receive the right-channel input signal $x_R(n)$. A left-channel adaptive compensation filter 152 may receive a left-channel pre-processor output signal $x_S(n)$. Similarly, a right-channel adaptive compensation filter 154 may receive a right-channel pre-processor output signal $x_D(n)$.

The left and right-channel adaptive compensation filters 152 and 154 may be implemented in hardware and/or software, and may include a digital signal processor (DSP). The DSP may execute instructions that delay an input signal one or more additional times, track frequency components of a signal, filter a signal, an/or attenuate or boost an amplitude of a signal. Alternatively, the left and right-channel adaptive compensation filters 152 and 154 or DSP may be implemented as discrete logic or circuitry, a mix of discrete logic and a processor, or may be distributed over multiple processors or software programs.

A filter summing circuit 156 may sum an output of the left and right-channel adaptive compensation filters 152 and 154 to produce an estimated signal $\hat{d}(n)$. An output summing circuit 158 may then sum the pre-processed microphone output signal d(n) and the estimated signal $\hat{d}(n)$ to provide the output or error signal e(n). The estimated signal $\hat{d}(n)$ may be subtracted from the pre-processed microphone output signal d(n), as indicated by the minus sign. The estimated signal $\hat{d}(n)$ may represent a compensation signal, which when subtracted from the microphone output signal d(n), may remove or dampen unwanted signals received by the microphone 130.

Figure 2:
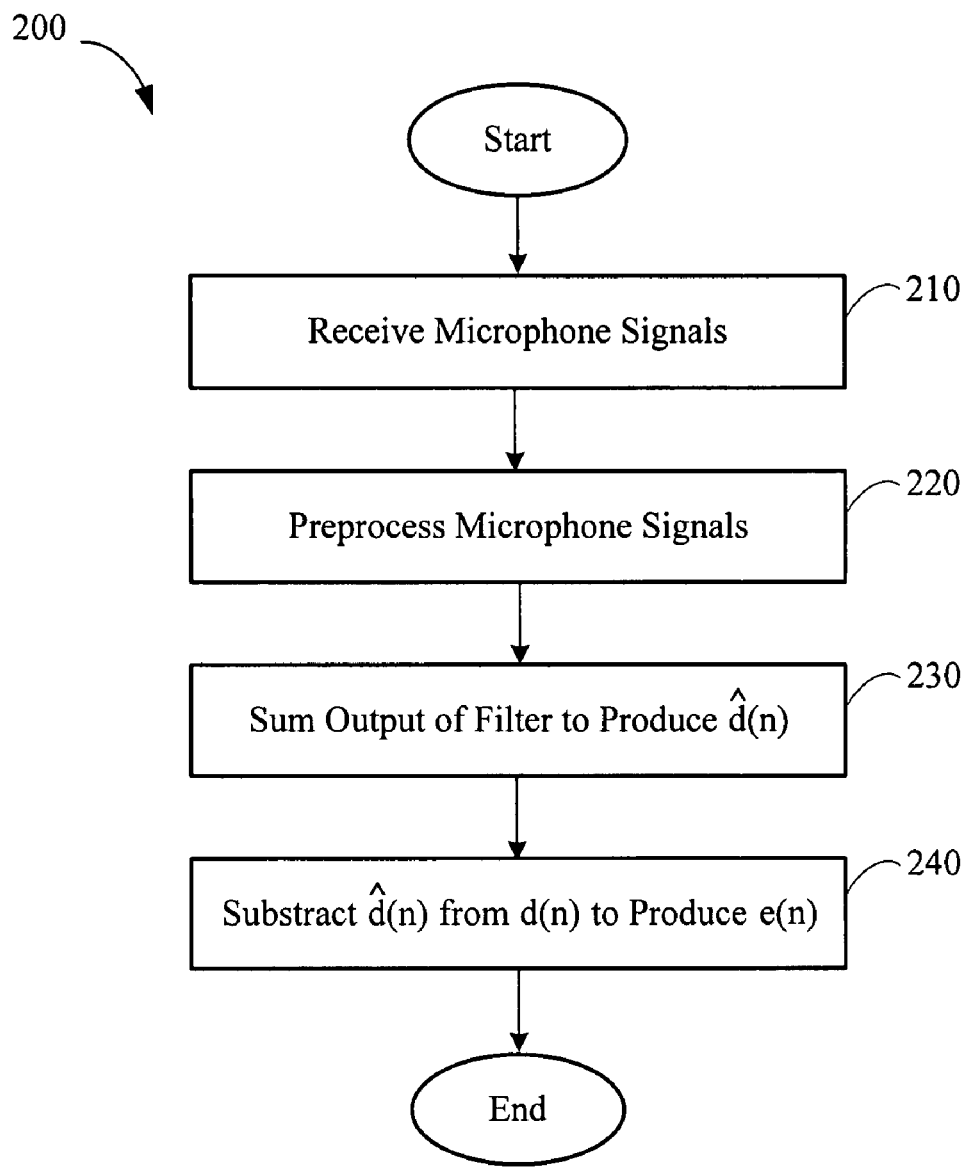
FIG. 2 is a flowchart that shows acts the system may take to process audio signals.

FIG. 2 shows a process 200 that the multi-channel echo compensation system 110 may perform to generate the error signal e(n). The microphone pre-processor circuit 136 may receive the microphone signals (Act 210) and process the signals (Act 220) to produce the pre-processed microphone output signal d(n). A filter summing circuit 156 may sum the output of the left and right-channel adaptive compensation filters 152 and 154 to produce an estimated signal $\hat{d}(n)$ (Act 230). The output or error signal e(n) may then be calculated (Act 240) by subtracting the estimated signal $\hat{d}(n)$ from the processed microphone output signal d(n).

The microphones 130 may be part of a hands-free telephone set. As such, the microphones 130 may acquire speech signals 166 from a speaker. It may be desirable to reduce the audio signals produced by the loudspeakers 116 and 120, including the echo signals, which may be apart of the microphone output signal d(n). The left channel and right channel adaptive compensation filters 152 and 154 may be configured to reduce such undesirable components. The impulse response of the left-channel and right-channel adaptive compensation filters 152 and 154 may be defined by the following:

$$\hat{h}_L(n)=[\hat{h}_{L,0}(n),\hat{h}_{L,1}(n),\ldots,\hat{h}_{L,N-1}(n)]^T$$

$$\hat{h}_R(n)=[\hat{h}_{R,0}(n),\hat{h}_{R,1}(n),\ldots,\hat{h}_{R,N-1}(n)]^T.$$

The left-channel and right-channel adaptive compensation filters 152 and 154 may be used to reduce the unwanted audio signals produced by the loudspeakers 116 and 120. Considerable processing power may be conserved if adaptation of some of the adaptive compensation filters 152 and 154 can be delayed during certain times. In that regard, the multi-channel echo compensation system 110 may prevent adaptation of some of the adaptive compensation filters if the left and right-channel input signals $x_L(n)$ and $x_D(n)$ are highly correlated. For example, a monaural signal output by two loudspeakers may be highly correlated because a difference signal corresponding to the two loudspeaker channels may be small.

The correlation value may have different forms. For example, the correlation value may be determined as a coherence value. A coherence threshold may be selected to be about 0.97. This means that the left and right-channel input signals $x_L(n)$ and $x_D(n)$ may be very similar, and the difference signal $x_D(n)$ may be small. For highly correlated signals, the summed signal may have a power level corresponding to about twice the input signal power $x_L(n)$ or $x_D(n)$. A correlation circuit 170 may calculate the degree of correlation between the left and right-channel input signals $x_L(n)$ and $x_D(n)$. The correlation circuit 170 may be implemented as part of the pre-processor 140 or as part of the adaptation filters 152 and 154, or may be part of a separate processor or may be located remote from in the echo compensation system 110.

If the input signals $x_L(n)$ and $x_D(n)$ are highly correlated, adaptation of all but one of the adaptive filters 152 and 154 may be deferred. This may represent a computational power savings of about 50% in a two-channel system using two adaptive filters. Of course, the multi-channel echo compensation system 110 may include more than two channels. For example, the multi-channel echo compensation system 110 may include four or more channels (and four or more adaptive filters) in a multi-channel configuration or in a surround-sound implementation. A greater computational power savings of about 75% may be realized in a four-channel system using four adaptive filters.

The order N of the left channel and right channel adaptive compensation filters 152 and 154 may be smaller than the order of the impulse responses. For example, left channel and right channel adaptive compensation filters 152 and 154 may use 300 to 500 coefficients at a sampling rate of about 11 kHz.

The left channel and right channel adaptive compensation filters 152 and 154 may provide a compensation signal to be subtracted from the microphone output signal d(n). This may result in an output signal e(n), sometimes referred to as an error signal, having the following form:

$$e(n) = d(n) - \sum_{i=0}^{N-1} \hat{h}_{L,i}(n) x_L(n-i) - \sum_{i=0}^{N-1} \hat{h}_{R,i}(n) x_R(n-i).$$

The error signal e(n) may be used to adapt the coefficients of the adaptive compensation filters 152 and 154. The adaptation of the filters may be performed such that the estimated impulse response $\hat{h}_{L,i}(n)$ and $\hat{h}_{R,i}(n)$ may closely approximate the real impulse responses $h_{L,i}(n)$ and $h_{R,i}(n)$.

Filter adaptation may be performed based on a least-squares type of process. The filter adaptation may be based on other processes, such as a normalized least mean squares process, a recursive least-squares process, and a proportional least mean squares process. Further variations of the minimization algorithm may be used to ensure that the output of the filters does not diverge.

Figure 3:
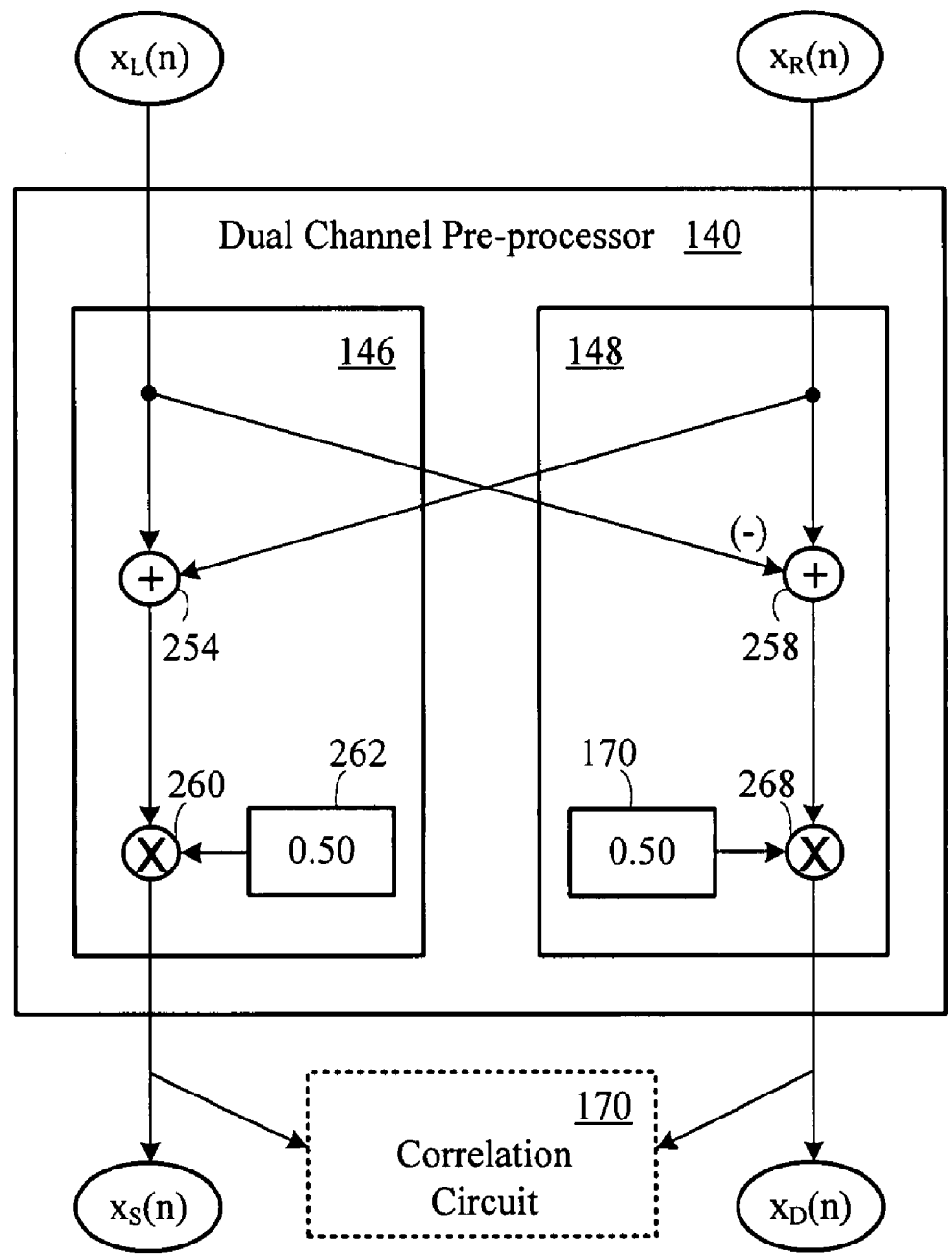
FIG. 3 shows a dual-channel pre-processor.

FIG. 3 shows the dual-channel pre-processor 140, including the left and right compensation channels 146 and 148. The left compensation channel 146 may receive the left-channel input signal $x_L(n)$, while the right compensation channel 148 may receive the right-channel input signal $x_R(n)$. A left-channel summing circuit 354 may sum the left-channel input signal $x_L(n)$ and the right-channel input signal $x_R(n)$. A right-channel summing circuit 358 may sum the right-channel signal input $x_R(n)$ and the negative of the left-channel input signal $x_L(n)$, as indicated by the minus sign.

A left-channel multiplier circuit 360 may multiply an output of the left-channel summing circuit 354 by a common weighting factor 362 equal to about 0.50. Similarly, a right-channel multiplier circuit 368 may multiply an output of the right-channel summing circuit 358 by a common weighting factor 370 equal to about 0.50. As a result, the left and right-channel pre-processor output signals $x_S(n)$ and $x_D(n)$ may be the linear combinations of the left and right-channel input signals $x_L(n)$ and $x_R(n)$. The pre-processor output signals $x_S(n)$ and $x_D(n)$ may represent a sum and difference signal, respectively. The pre-processor output signals $x_S(n)$ and $x_D(n)$ may be represented by the equations below where a common weighting factor may be realized by shifting an accumulator bit by one position.

$$x_s(n) = \frac{1}{2}[x_L(n) + x_R(n)],$$

$$x_D(n) = \frac{1}{2}[x_L(n) - x_R(n)].$$

In a two channel system, for example, the weighting factor may be equal to about 0.50. When more than two channels exist, the weighting factor may be set equal to about the reciprocal of the number of channels. Accordingly, in a four channel system, the weighting factor may be equal to about 0.25.

As mentioned, the summed signal or the output from the first summing circuit 354 may have a power level that corresponds to about twice the signal power of the left or right-channel input signals $x_L(n)$ and $x_D(n)$ for highly correlated signals. The output of the left-channel summing circuit 354 may be scaled by the common weighting factor 362 of about 0.5 to normalize the signal amplitude.

Figure 4:
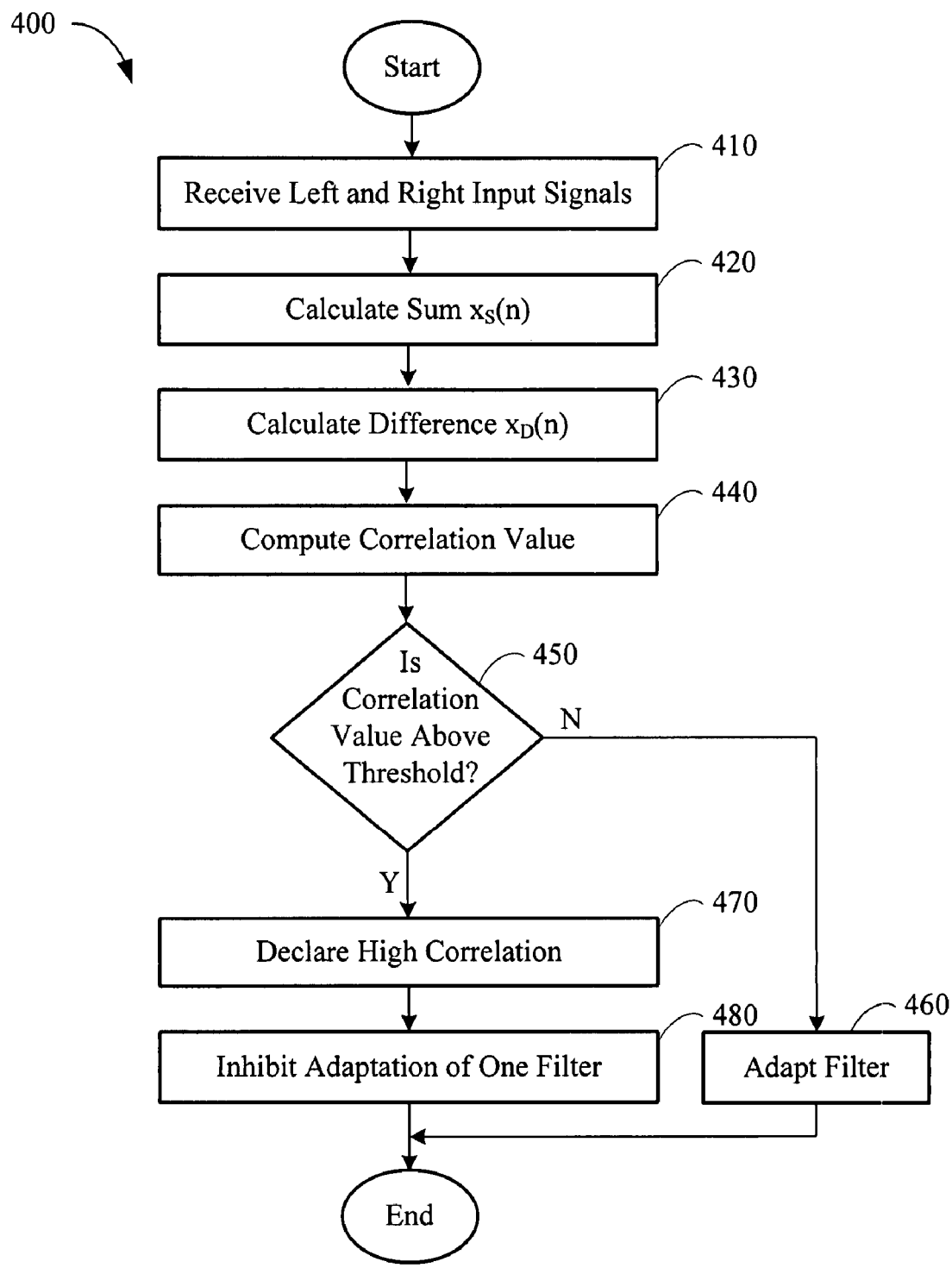
FIG. 4 is a flowchart that shows acts the system may take to calculate a correlation value.

FIG. 4 shows another process. The dual channel pre-processor 140 may receive left and right channel input signals $x_L(n)$ and $x_R(n)$ (Act 410). Next, the left and right channel input signals $x_L(n)$ and $x_R(n)$ may be summed to produce the left-channel pre-processor output signal $x_S(n)$ (Act 420). The left and right channel input signals $x_L(n)$ and $x_R(n)$ may then be subtracted to produce the right-channel pre-processor output or difference signal $x_D(n)$ (Act 430). The difference signal $x_D(n)$ may be inspected to determine a correlation value (Act 440) between the left and right channel input signals $x_L(n)$ and $x_R(n)$ (Act 440). If the correlation value is below a pre-determined value or threshold (Act 450), for example, about 97%, the left and right-channel adaptive filters 146 and 148 may be adapted (Act 460). If the correlation value is greater than or equal to the predetermined value or threshold, the pre-processor may declare that the signals are highly correlated (Act 470), and adaptation of the right-channel adaptive filter 148 may be inhibited (Act 480).

Figure 5:
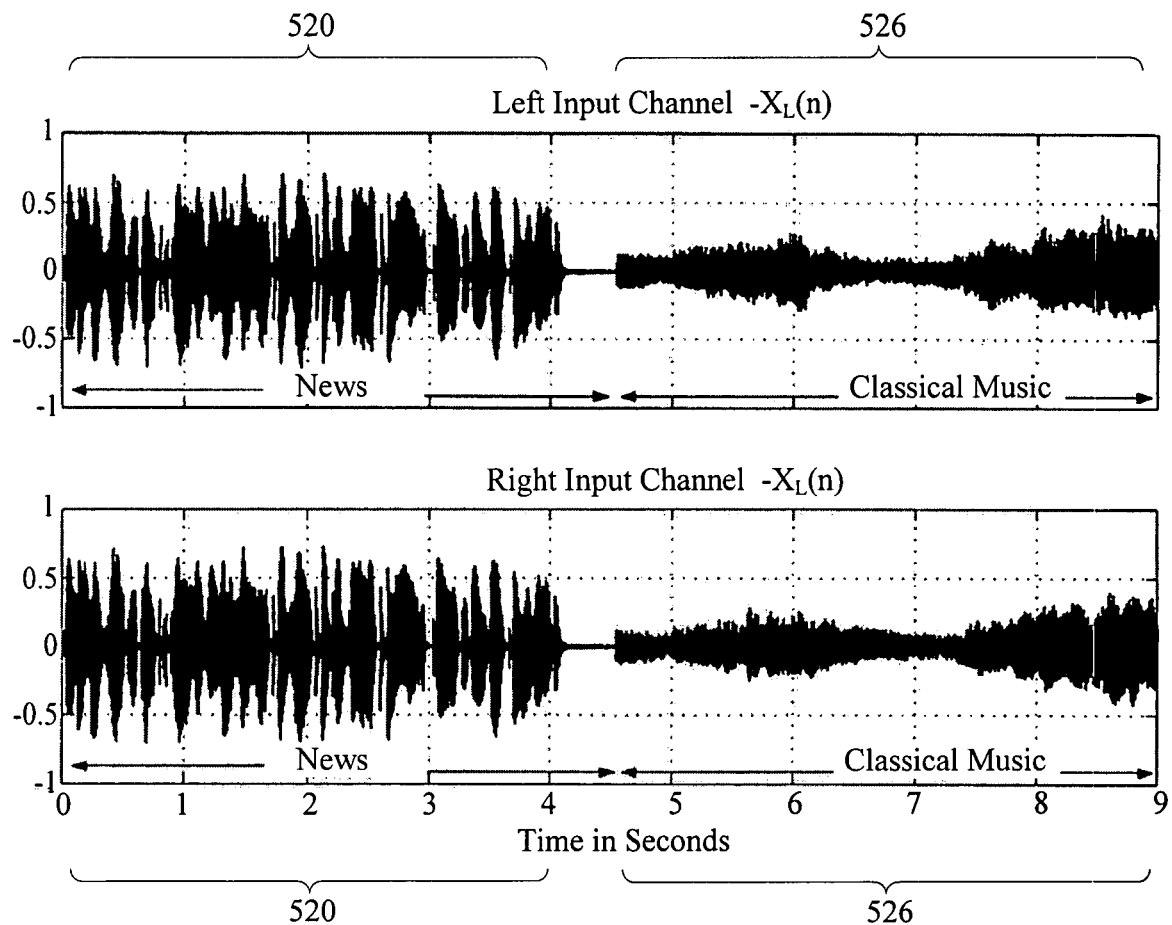
FIG. 5 shows left and right channel input signals.

FIG. 5 shows the variation in time of a typical stereo radio signal. The upper panel may correspond to the left-channel input signal $x_L(n)$, and the lower panel may correspond to the right-channel input signal $x_R(n)$. A power spectrum associated with playback of a news program may be depicted in the left-most half 520 of the panels. A power spectrum associated with playback of a classical music program may be depicted in the right-most half 526 of the panels.

Figure 6:
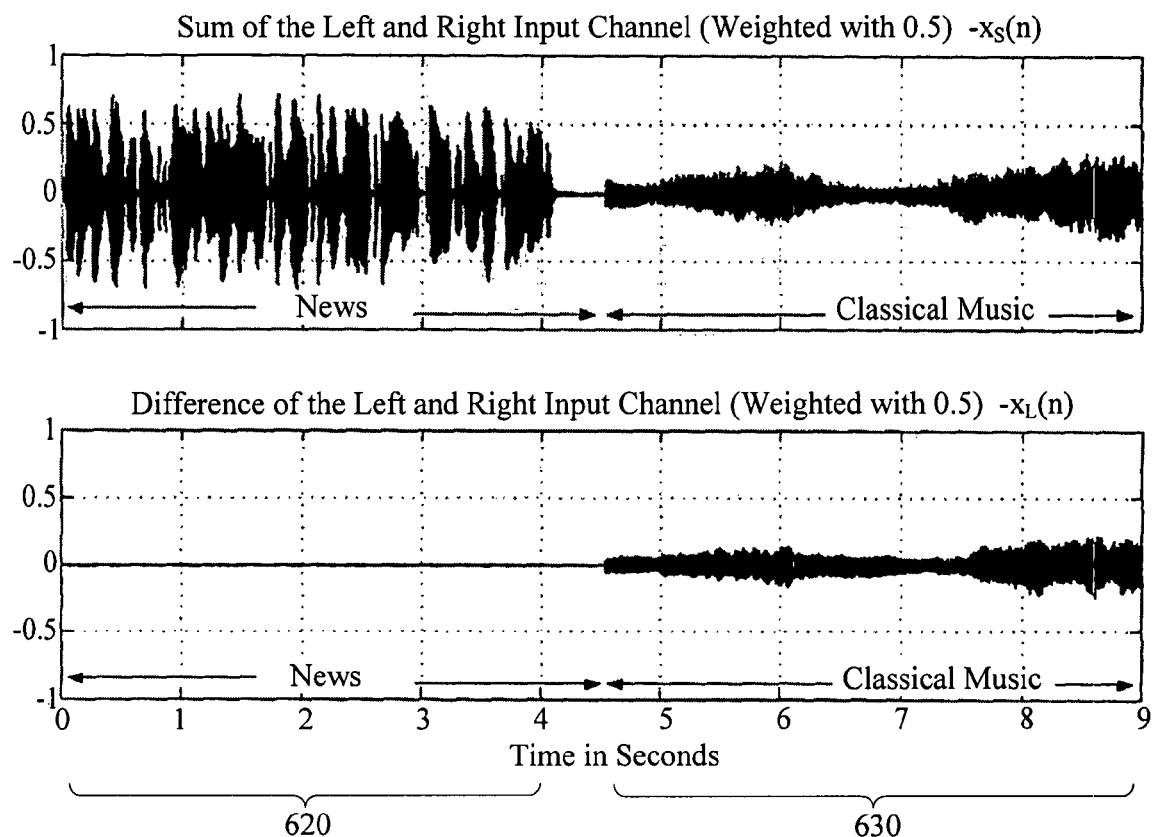
FIG. 6 shows the sum and difference signals corresponding to the left and right channel input signals.

FIG. 6 shows the left and right-channel pre-processor output signals $x_S(n)$ and $x_D(n)$ when the dual-channel pre-processor 140 is provided with the left and right-channel input signals $x_L(n)$ and $x_R(n)$ of FIG. 5. The upper graph shows $x_S(n)$ weighted by the common weighting factor of about 0.5, while the lower graph may show $x_D(n)$ weighted by same common weighting factor.

Because the signal corresponding to the playback of news may be a monaural signal, the right-channel pre-processor output signal $x_D(n)$ (the "difference signal") may approach a zero value during time period 620. When classical music is used as the input signal, both the left-channel pre-processor output signal $x_D(n)$ (the "summed signal") and the difference signal $x_D(n)$ may only differ slightly from the left and right-channel input signals $x_L(n)$ and $x_R(n)$ during time period 630.

The echo compensation system 110 may measure the power spectrum of the right-channel pre-processor output signal $x_D(n)$. When the measured power spectrum falls below a pre-determined threshold, the echo compensation system 110 may inhibit adaptation of the right-channel adaptive compensation filter 154.

For a two channel system, the computing power required to adapt the compensations filters 152 and 154 may be approximately halved during the time that adaptation is inhibited. Note that adaptation of the right-channel adaptive compensation filter 154 may be inhibited if the correlation value between the left and right-channel input signals $x_L(n)$ and $x_R(n)$ is above a predetermined threshold value. In other words, when the difference signal $x_D(n)$ is below a certain value.

Figure 7:
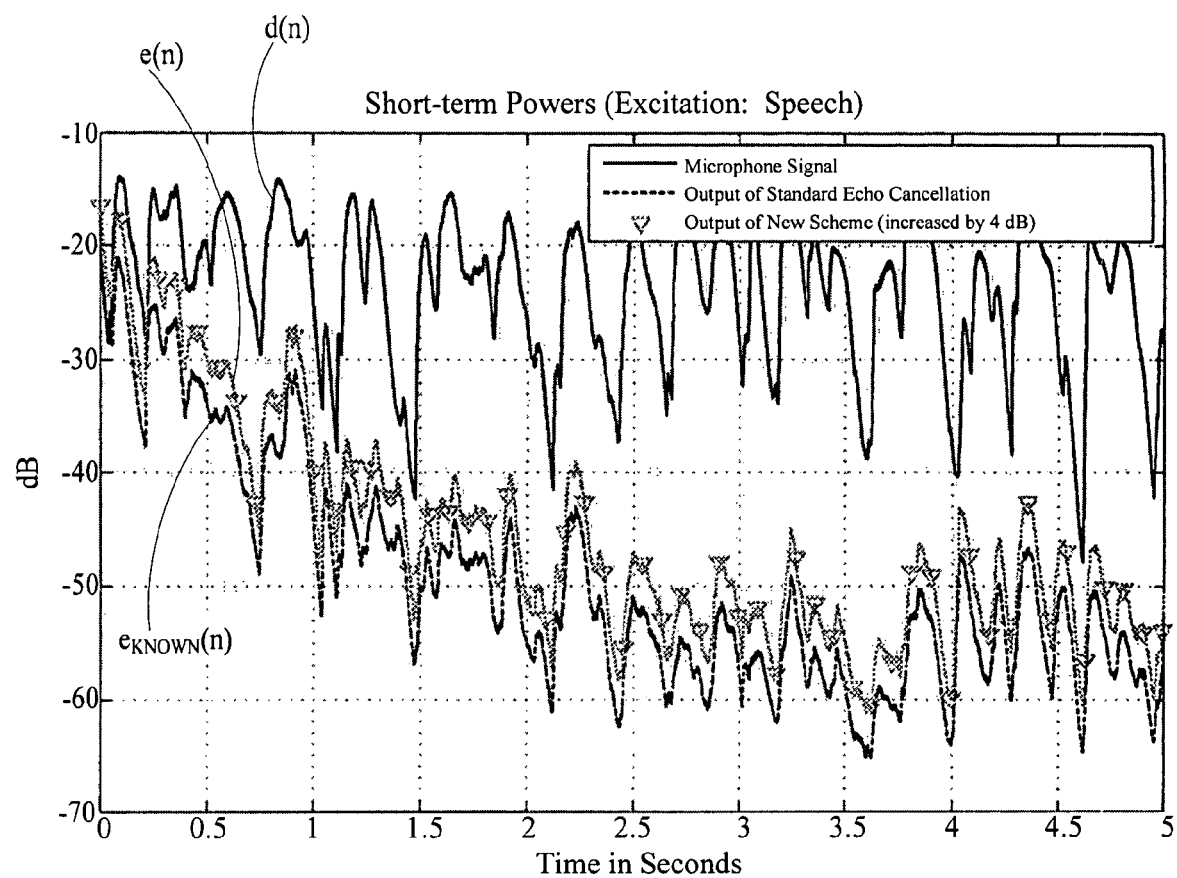
FIG. 7 shows a microphone output signal with and without echo cancellation.

FIG. 7 shows three output signals. The first signal is a microphone output signal d(n). The second signal is an output signal $e_{known}(n)$ of a system using certain echo cancellation techniques. The third signal is an output signal e(n) generated by the multi-channel echo compensation system 110. The signal d(n) may represent the microphone output signal without echo compensation. The output signal e(n) of the multi-channel echo compensation system 110 may be shown with about a 4 dB boost for purposes of clarity. However, without the additional 4 dB boost, the output signal processed according to some echo compensating techniques $e_{known}(n)$ may be almost indistinguishable from the output signal $e(n)$ generated by the multi-channel echo compensation system 110. This illustrates that the resulting echo reduction may still be very effective even though adaptation of the right-channel adaptive compensation filter 154 is prevented. Accordingly, multi-channel echo compensation system 110 may provide effective echo-cancelling while using significantly less computing power.

A correlation value between the left and right-channel input signals $x_L(n)$ and $x_R(n)$ may be performed by determining the squared norm of the signal power at the output of the pre-processor 140. The correlation value may be determined using recursive methods to reduce computational costs. For example, if the signal vectors have a length N, the squared norm of the signal vector at time n equals the squared norm of the vector at time n−1 plus the $n^{th}$ value squared of the signal vector minus the $(n−N)^{th}$ value squared of the signal vector. The correlation value may be determined according to the follow equations:

$$\|x_S(n)\|^2 = \|x_S(n-1)\|^2 + x_S^2(n) - x_S^2(n-N),$$

$$\|x_D(n)\|^2 = \|x_D(n-1)\|^2 + x_D^2(n) - x_D^2(n-N).$$

For highly correlated input signals $x_L(n)$ and $x_R(n)$, the corresponding difference signal $x_D(n)$ may be small. In particular, the signal power may be determined as the norm of a corresponding signal vector. Thus, a good indication of the correlation between the two signals may be obtained.

If the correlation value falls below a pre-determined threshold, corresponding release variable $a_S(n)$ and $a_D(n)$ may be set to zero according to the equations below:

$$a_S(n) = \begin{cases} 1, & \text{if } \|x_S(n)\|^2 > P_0, \\ 0, & \text{else,} \end{cases}$$

$$a_D(n) = \begin{cases} 1, & \text{if } \|x_D(n)\|^2 > P_0, \\ 0, & \text{else.} \end{cases}$$

The pre-determined threshold, for example, may be set to about 0.03. Accordingly, the determination of the output signal $e(n)$ after subtraction of the compensation signal may be represented by the following:

$$e(n) = d(n) - a_S(n) \sum_{i=0}^{N-1} \hat{h}_{S,i}(n) x_S(n-i) - a_D(n) \sum_{i=0}^{N-1} \hat{h}_{D,i}(n) x_D(n-i).$$

In the equation above, the summed terms, which may correspond to a convolution, may be determined if the corresponding release variables are non-zero. Thus, adaptation of the adaptive compensation filters may be performed under the conditions given by the following equations:

$$\hat{h}_{S,i}(n+1) = \begin{cases} \hat{h}_{S,i}(n) + \mu \frac{x_S(n-i)e(n)}{\|x_S(n)\|^2 + \|x_D(n)\|^2}, & \text{if } a_S(n) = 1 \\ \hat{h}_{S,i}(n), & \text{else} \end{cases}$$

$$\hat{h}_{D,i}(n+1) = \begin{cases} \hat{h}_{D,i}(n) + \mu \frac{x_D(n-i)e(n)}{\|x_S(n)\|^2 + \|x_D(n)\|^2}, & \text{if } a_S(n) = 1 \\ \hat{h}_{D,i}(n), & \text{else.} \end{cases}$$

Note that adaptive filters of some echo compensation systems may exhibit convergence behavior according to the equations below when the input signals are not entirely correlated $$\hat{h}_L(n)\big|_{E\{e^2(n)\}\to min} = h_L(n),$$

$$\hat{h}_R(n)\big|_{E\{e^2(n)\}\to min} = h_R(n).$$

However, the multi-channel echo compensation system 110 may exhibit convergence according to the equations below even if the input signals are fully correlated. Accordingly, the multi-channel echo compensation system 110 may avoid a non-unique solution:

$$\hat{h}_S(n)\big|_{E\{e^2(n)\}\to min} = h_L(n) + h_R(n),$$

$$\hat{h}_D(n)\big|_{E\{e^2(n)\}\to min} = h_L(n) - h_R(n).$$

Figure 8:
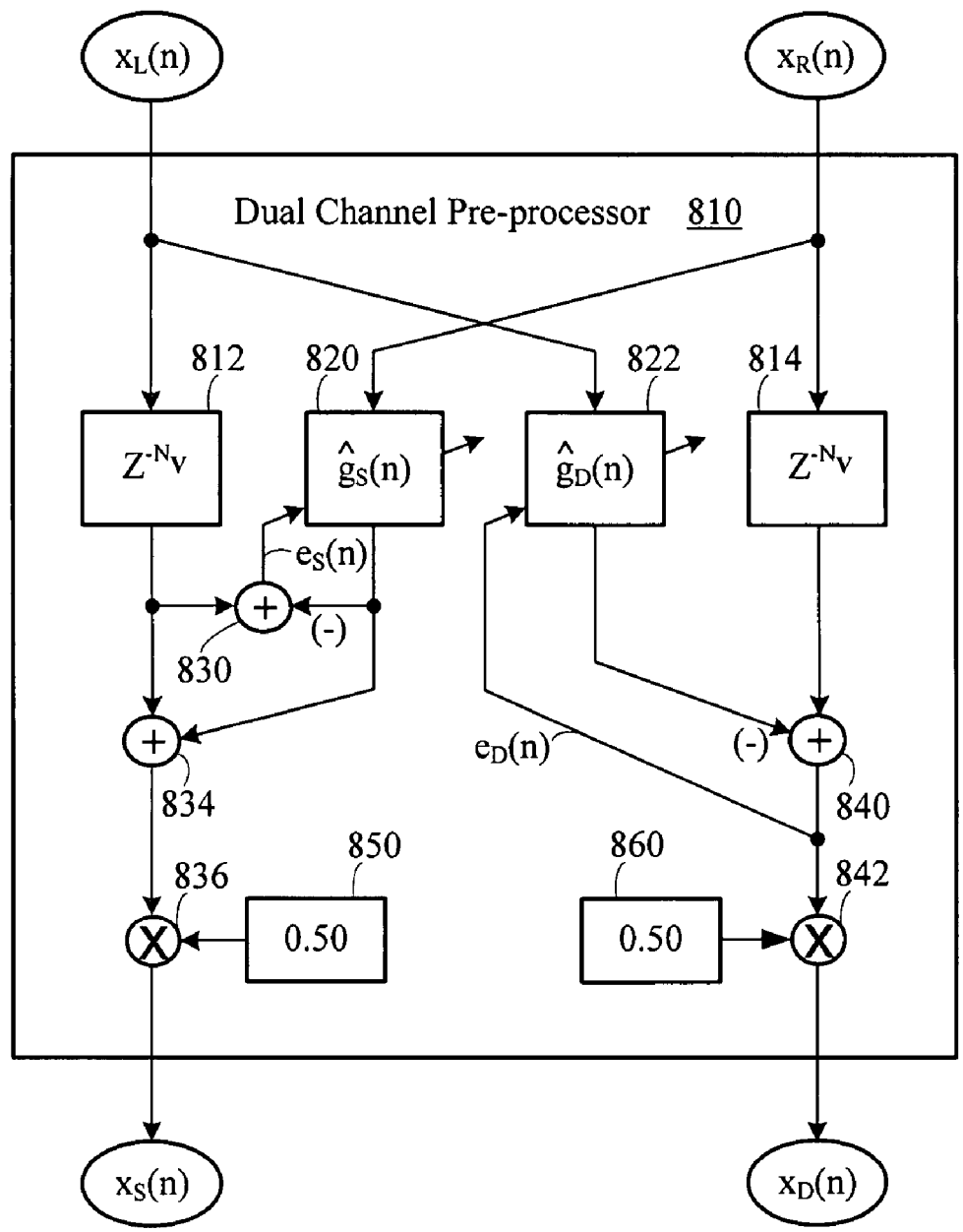
FIG. 8 shows a dual-channel pre-processor having delay circuits.

FIG. 8 shows an alternate aspect of a dual-channel pre-processor 810, which may be used in place of the pre-processor 140 shown in FIG. 3. The pre-processor 810 may include left and right channel delay circuits 812 and 814, left and right channel adaptive pre-processing filters 820 and f22, and a left-channel first summing circuit 830. The pre-processor 810 may also include a left-channel second summing circuit 834, a left-channel multiplier circuit 836, a right-channel summing circuit 840 and a right-channel multiplier circuit 842. The right-channel pre-processing filter 822 and the left-channel delay circuit 812 may receive the left-channel input signal $x_L(n)$. Similarly, the left-channel pre-processing filter 820 and right-channel delay circuit 814 may receive the right-channel input signal $x_R(n)$.

The left-channel first summing circuit 830 may sum an output of the left-channel delay circuit 812 and the left-channel adaptive pre-processing filter 820 to produce a left-channel error signal $e_S(n)$. The left-channel error signal $e_S(n)$ may be used to adapt the left-channel adaptive pre-processing filter 820. Note that an output of the left-channel pre-processor filter 820 may be subtracted from an output of the left-channel delay circuit 812, as indicated by the minus sign. The left-channel multiplier circuit 836 may multiply an output of the left-channel second summing circuit 834 by a common weighting factor 850 equal to about 0.5. The left-channel multiplier circuit 836 may provide the left-channel pre-processor output signal $x_S(n)$.

The right-channel summing circuit 840 may sum an output of the right-channel delay circuit 814 and the right-channel adaptive pre-processing filter 822 to produce a right-channel error signal $e_D(n)$. The right-channel error signal $e_D(n)$ may be used to adapt the right-channel adaptive pre-processing filter 822. Note that an output of the right-channel pre-processor filter 822 may be subtracted from an output of the right-channel delay circuit 814, as indicated by the minus sign. The right-channel multiplier circuit 842 may multiply an output of the right-channel summing circuit 840 by a common weighting factor 860 equal to about 0.5. The right-channel multiplier circuit 842 may provide the right-channel pre-processor output signal $x_D(n)$.

Use of the delay circuits 812 and 814 may ensure that the adaptive pre-processing filters 820 and 822 both converge to optimal solutions. The delay attributed to the delay circuits 812 and 814 may be configured or programmed to be about one-half of the length of the corresponding filters.

The dual-channel pre-processor 810 may be used in an interview situation where one of the speakers is positioned closer or further from a microphone relative to the other speaker. The amplitude of the left or right channel may then be changed and/or delays may be inserted. Additional filters that modify the tone may also be used.

Two speakers may be located on different sides relative to a microphone during an interview. The amplitude of one speaker's voice may be greater on a first channel, while the amplitude of the other speaker's voice may be greater on the second channel. In this circumstance, the left and right-channel input signals $x_L(n)$ and $x_R(n)$ may be considered to be highly correlated, but their difference signal, $x_D(S)$, may not approach a zero value. The adaptive pre-processing filters 820 and 822 and their associated delay circuits 812 and 814 may overcome this problem.

The left-channel pre-processor output signal $x_S(n)$ and right-channel pre-processor output signal $x_D(n)$ provided by the dual-channel pre-processor 810 may be represented by the following equations:

$$x_D(n) = \frac{1}{2}\left[x_R(n - N_V) - \sum_{i=0}^{N_G} x_L(n-i)\hat{g}_{D,i}(n)\right],$$

$$x_S(n) = \frac{1}{2}\left[x_L(n - N_V) + \sum_{i=0}^{N_G} x_R(n-i)\hat{g}_{S,i}(n)\right].$$

Adaptation of the left and right-channel adaptive pre-processing filters 820 and 822 may be performed using a least-squares type of process. Alternatively, other processes may be used, such as a normalized least mean squares process, a recursive least-squares process, and a proportional least mean squares process. Further variations of the minimization process may be used to ensure that the output does not diverge.

Adaptation of the left and right-channel adaptive pre-processing filters 820 and 822 may be based on determination of the left and right-channel error signals $e_S(n)$ and $e_D(n)$. The left and right-channel error signals $e_S(n)$ and $e_D(n)$ may be determined in accordance with the following equations:

$$e_D = 2x_D(n)$$

$$e_S(n) = x_L(n-N_V) - \sum_{i=0}^{N_G} x_R(n-i)\hat{g}_{S,i}(n).$$

Adaptation of the left and right-channel adaptive pre-processing filters 820 and 822 may be performed according to the equations below:

$$\hat{g}_{D,i}(n+1) = \hat{g}_{D,i}(n) + \mu_G \frac{x_L(n-i)e_D(n)}{\sum_{p=0}^{N_G} x_L^2(n-p)},$$

-continued $$\hat{g}_{S,i}(n+1) = \hat{g}_{S,i}(n) + \mu_G \frac{x_R(n-i)e_S(n)}{\sum_{p=0}^{N_G} x_R^2(n-p)}.$$

The adaptation of the left and right-channel adaptive pre-processing filters 820 and 822 may be performed at a slower rate than the adaptation of the adaptive compensation filters 152 and 154 of FIG. 1. A slower adaptation rate may be achieved, for example, by choosing smaller increments, such that $0 \leq \mu_G \ll \mu \leq 1$. Because the left and right-channel adaptive pre-processing filters 820 and 822 may not necessarily converge toward an optimal solution, left and right channel delay circuits 812 and 814 may be configured so that the delay times of $N_V$ cycles may be about half of the corresponding filter non-causal parts, where $$N_V \approx \frac{N_G}{2}.$$

When the input signals are monaural signals, meaning $x_L(n)=x_R(n)$, the left and right-channel adaptive pre-processing filters 820 and 822 may both converge to optimal solutions. The transfer functions may be represented by the following:

$$\hat{G}_S(e^{j\Omega})\big|_{E\{e_S^2(n)\}\to\min} = e^{-j\Omega N_V},$$

$$\hat{G}_D(e^{j\Omega})\big|_{E\{e_D^2(n)\}\to\min} = e^{-j\Omega N_V}.$$

Based on the transfer functions, the left and right-channel pre-processor output signals $x_S(n)$ and $x_D(n)$ may then have the form governed by the equations below. The below equations may be similar to the equations governing the dual-channel pre-processor 140 of FIG. 1 except for a delay of $N_V$ cycles:

$$x_S(n) = \frac{1}{2}[x_R(n-N_V) + x_L(n-N_V)],$$

$$x_D(n) = \frac{1}{2}[x_R(n-N_V) - x_L(n-N_V)].$$

The multi-channel echo compensation system 110 has been described for the case using two audio channels (e.g., for a stereophonic system). However, the multi-channel echo compensation system 110 may include more than two channels. If more than two channels are present, the dual channel pre-processor 140 or 810 may be configured to delay adaptation of all but one of the adaptive filters if a correlation value is greater than a predetermined threshold value, for example, at about a 97% correlation.

The logic, circuitry, and processing described above may be encoded in a computer-readable medium such as a CDROM, disk, flash memory, RAM or ROM, an electromagnetic signal, or other machine-readable medium as instructions for execution by a processor. Alternatively or additionally, the logic may be implemented as analog or digital logic using hardware, such as one or more integrated circuits (including amplifiers, adders, delays, and filters), or one or more processors executing amplification, adding, delaying, and filtering instructions; or in software in an application programming interface (API) or in a Dynamic Link Library (DLL), functions available in a shared memory or defined as local or remote procedure calls; or as a combination of hardware and software.

The logic may be represented in (e.g., stored on or in) a computer-readable medium, machine-readable medium, propagated-signal medium, and/or signal-bearing medium. The media may comprise any device that contains, stores, communicates, propagates, or transports executable instructions for use by or in connection with an instruction executable system, apparatus, or device. The machine-readable medium may selectively be, but is not limited to, an electronic, magnetic, optical, electromagnetic, or infrared signal or a semiconductor system, apparatus, device, or propagation medium. A non-exhaustive list of examples of a machine-readable medium includes: a magnetic or optical disk, a volatile memory such as a Random Access Memory "RAM," a Read-Only Memory "ROM," an Erasable Programmable Read-Only Memory (i.e., EPROM) or Flash memory, or an optical fiber. A machine-readable medium may also include a tangible medium upon which executable instructions are printed, as the logic may be electronically stored as an image or in another format (e.g., through an optical scan), then compiled, and/or interpreted or otherwise processed. The processed medium may then be stored in a computer and/or machine memory.

The systems may include additional or different logic and may be implemented in many different ways. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instruction sets may be parts of a single program, separate programs, or distributed across several memories and processors. The systems may be included in a wide variety of electronic devices, including a cellular phone, a headset, a hands-free set, a speakerphone, communication interface, or an infotainment system.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for compensating for echoes in a multi-channel system, the system including at least two loudspeakers, each loudspeaker driven by a respective audio source signal, at least one microphone providing a microphone output signal, the microphone output signal including undesirable signals produced by the loudspeakers, the method comprising:
   receiving the respective audio source signals driving the loudspeakers;
   pre-processing the respective audio source signals to provide respective pre-processed output signals and to determine a correlation value corresponding to the respective audio source signals;
   adaptively filtering the respective pre-processed output signals by respective adaptive compensation filters to provide a compensation signal;
   inhibiting adaptation of all but one of the adaptive compensation filters if the correlation value is greater than a predetermined value; and
   combining the compensation signal with the microphone output signal containing the undesirable signals to remove the undesirable signals.

2. The method according to claim 1, where the pre-processing comprises providing a sum signal and a difference signal, corresponding to the respective received audio source signals.

3. The method according to claim 2, where the pre-processing comprises multiplying the sum signal and the difference signal by a weighting factor.

4. The method according to claim 3, where the weighting factor is equal to about 0.50 for a two channel system.

5. The method according to claim 3, where the weighting factor is about equal to a reciprocal of a number of channels.

6. The method according to claim 1, where determining the correlation value is based on a signal power of the respective received audio source signals.

7. The method according to claim 1, where the correlation value is determined recursively.

8. The method according to claim 1, where inhibiting adaptation of all but one of the adaptive compensation filters reduces a computational load.

9. The method according to claim 1, where the system includes first and second loudspeakers driven by first and second audio source signals, respectively, where calculating the correlation value comprises summing the first and second audio source signals to obtain a summed signal, and subtracting the first and second audio source signals to obtain a difference signal.

10. The method according to claim 9, where the pre-processing comprises:
   adaptively filtering the first audio source signal by a first pre-processing adaptive filter to provide a filtered first audio signal, adaptation based on a difference between the first and second audio source signals;
   subtracting the filtered first audio signal from the second audio source signal;
   adaptively filtering the second audio source signal by a second pre-processing adaptive filter to provide a filtered second audio signal, adaptation based on a difference between the first and second audio source signals;
   adding the filtered second audio signal and the first audio source signal; and
   inhibiting adaptation of the first pre-processing adaptive filter if the correlation value is greater than the predetermined value.

11. The method according to claim 10, where adaptation of the respective pre-processing adaptive filter is performed at a slower rate than adaptation of the respective adaptive compensation filter.

12. A non-transitory computer-readable storage medium having processor executable instructions to compensate for echoes in a multi-channel system having at least two loudspeakers, each loudspeaker driven by a respective audio source signal, at least one microphone providing a microphone output signal, the microphone output signal including undesirable signals produced by the loudspeakers, by performing the acts of:
   receiving the respective audio source signals driving the loudspeakers;
   pre-processing the respective audio source signals to provide respective pre-processed output signals and to determine a correlation value corresponding to the respective audio source signals;
   adaptively filtering the respective pre-processed output signals by respective adaptive compensation filters to provide a compensation signal;

delaying adaptation of all but one of the adaptive compensation filters if the correlation value is greater than a predetermined value; and combining the compensation signal with the microphone output signal containing the undesirable signals so as to remove the undesirable signals.

13. The non-transitory computer-readable storage medium of claim 12 further comprising processor executable instructions to cause a processor to perform the act of providing a sum signal and a difference signal corresponding to the respective received audio source signals.

14. The non-transitory computer-readable storage medium of claim 12 further comprising processor executable instructions to cause a processor to perform the act of multiplying the sum signal and the difference signal by a weighting factor.

15. An echo compensation system comprising:
a pre-processor circuit configured to receive the respective audio source signals;
the pre-processor circuit configured to determine a correlation value corresponding to the respective audio source signals and provide respective pre-processed output signals;
respective adaptive compensation filters in communication with the pre-processor circuit and configured to receive the respective pre-processed output signals, the adaptive compensation filters providing a compensation signal, where adaptation of feast all but one of the adaptive compensation filters is inhibited if the correlation value is greater than a predetermined value; and
a summing circuit configured to combine the compensation signal and a microphone output signal containing the undesirable signals so as to remove the undesirable signals.

16. The echo compensation system of claim 15, where the pre-processor circuit comprises:
a first summing circuit configured to add the respective received audio source signals; and
a second summing circuit configured to subtract the respective received audio source signals.

17. The echo compensation system of claim 15, where the pre-processor circuit comprises:
a first multiplier circuit configured to multiply an output of the first summing circuit by a weighting factor; and
a second multiplier circuit configured to multiply an output of the second summing circuit by the weighting factor.

18. The echo compensation system of claim 17, where the weighting factor is equal to about 0.50 for a two channel system.

19. The echo compensation system of claim 17, where the weighting factor is about equal to a reciprocal of a number of channels.

20. The echo compensation system of claim 15, where the correlation value is based on a signal power of the respective audio source signals.

21. The echo compensation system of claim 15, comprising:
a first adaptive pre-filter configured to filter a first audio source signal to provide a filtered first audio signal, adaptation of the first adaptive pre-filter based on a difference between the first and second audio source signals;
a first summing circuit adapted to subtract the filtered first audio signal from the second audio source signal;
a second adaptive pre-filter configured to filter a second audio source signal to provide a filtered second audio signal, adaptation of the second adaptive pre-filter based on a difference between the first and second audio source signals; and
a second summing circuit configured to add the filtered second audio signal and the first audio source signal.

22. The echo compensation system of claim 21, comprising:
a first delay circuit in communication with the first summing circuit configured to delay the second audio source signal prior to the subtraction; and
a second delay circuit in communication with the second summing circuit configured to delay the first audio source signal prior to the addition.

23. The echo compensation system of claim 21, where adaptation of the respective adaptive pre-filters is performed at a slower rate than adaptation of the respective adaptive compensation filters.

24. A method for compensating for echoes in a multi-channel system, the system including first and second loudspeakers driven by first and second audio source signals, respectively, at least one microphone providing a microphone output signal, the microphone output signal including undesirable signals produced by the loudspeakers, the method comprising:
receiving the respective audio source signals driving the loudspeakers;
pre-processing the first and second audio source signals to provide respective pre-processed output signals and to calculate a correlation value by a process including summing the first and second audio source signals to obtain a summed signal, and subtracting the first and second audio source signals to obtain a difference signal, wherein pre-processing includes:
adaptively filtering the first audio source signal by a first pre-processing adaptive filter to provide a filtered first audio signal, adaptation based on a difference between the first and second audio source signals;
subtracting the filtered first audio signal from the second audio source signal;
adaptively filtering the second audio source signal by a second pre-processing adaptive filter to provide a filtered second audio signal, adaptation based on a difference between the first and second audio source signals;
adding the filtered second audio signal and the first audio source signal; and
inhibiting adaptation of the first pre-processing adaptive filter if the correlation value is greater than a predetermined threshold value;
adaptively filtering the respective pre-processed output signals by respective adaptive compensation filters to provide a compensation signal;
inhibiting adaptation of at least one adaptive compensation filter if the correlation value is greater than a predetermined value; and
combining the compensation signal with the microphone output signal containing the undesirable signals to remove the undesirable signals.

25. The method according to claim 24, where adaptation of the respective pre-processing adaptive filter is performed at a slower rate than adaptation of the respective adaptive compensation filter.

26. An echo compensation system comprising:
a pre-processor circuit configured to receive a first audio source signal and a second audio source signal, the pre-processor circuit configured to determine a correlation value corresponding to the respective audio source signals and provide respective pre-processed output signals, the pre-processor circuit including:
  a first adaptive pre-filter configured to filter the first audio source signal to provide a filtered first audio signal, adaptation of the first adaptive pre-filter based on a difference between the first and second audio source signals;
  a first summing circuit adapted to subtract the filtered first audio signal from the second audio source signal;
  a second adaptive pre-filter configured to filter the second audio source signal to provide a filtered second audio signal, adaptation of the second adaptive pre-filter based on a difference between the first and second audio source signals; and
  a second summing circuit configured to add the filtered second audio signal and the first audio source signal;
respective adaptive compensation filters in communication with the pre-processor circuit and configured to receive the respective pre-processed output signals, the adaptive compensation filters providing a compensation signal, where adaptation of at least one adaptive compensation filter is inhibited if the correlation value is greater than a predetermined value; and
  a summing circuit configured to combine the compensation signal and the microphone output signal containing the undesirable signals so as to remove the undesirable signals.

27. The echo compensation system of claim 26, comprising:
  a first delay circuit in communication with the first summing circuit configured to delay the second audio source signal prior to the subtraction; and
  a second delay circuit in communication with the second summing circuit configured to delay the first audio source signal prior to the addition.

28. The echo compensation system of claim 26, where adaptation of the respective adaptive pre-filters is performed at a slower rate than adaptation of the respective adaptive compensation filters.

* * * * *